US008651956B2

(12) United States Patent
Nguyen et al.

(10) Patent No.: US 8,651,956 B2
(45) Date of Patent: Feb. 18, 2014

(54) METHOD AND SYSTEM FOR INSTANT-ON GAME DOWNLOAD

(75) Inventors: Binh T. Nguyen, Reno, NV (US); Joseph R. Hedrick, Reno, NV (US); Bryan Wolf, Reno, NV (US)

(73) Assignee: IGT, Reno, NV (US)

( * ) Notice: Subject to any disclaimer, the term of this patent is extended or adjusted under 35 U.S.C. 154(b) by 127 days.

(21) Appl. No.: 12/986,861

(22) Filed: Jan. 7, 2011

(65) Prior Publication Data

US 2011/0105234 A1 May 5, 2011

Related U.S. Application Data

(63) Continuation of application No. 11/224,814, filed on Sep. 12, 2005, now Pat. No. 7,887,420.

(51) Int. Cl.
*A63F 13/10* (2006.01)
*G07F 17/32* (2006.01)

(52) U.S. Cl.
USPC .................. 463/42; 463/43; 463/29; 463/16; 345/473

(58) Field of Classification Search
USPC .................... 463/16, 17, 25, 29, 42; 345/473
See application file for complete search history.

(56) References Cited

U.S. PATENT DOCUMENTS 3,931,504 A 1/1976 Jacoby
4,072,930 A 2/1978 Lucero et al.
4,335,809 A 6/1982 Wain
4,430,728 A 2/1984 Beitel et al.
4,454,594 A 6/1984 Heffron et al.
4,468,750 A 8/1984 Chamoff et al.
4,532,416 A 7/1985 Berstein
4,572,509 A 2/1986 Sitrick
4,582,324 A 4/1986 Koza et al.
4,607,844 A 8/1986 Fullerton
4,652,998 A 3/1987 Koza et al.

(Continued)

FOREIGN PATENT DOCUMENTS

AU 199650576 4/1997
DE 197 30 002 A1 12/1997

(Continued)

OTHER PUBLICATIONS

Nguyen, et al. "Distributed Game Services," U.S. Appl. No. 11/225,337, filed Sep. 12, 2005.

(Continued)

*Primary Examiner* — Melba Bumgarner
*Assistant Examiner* — Frank M Leiva
(74) *Attorney, Agent, or Firm* — Foley & Lardner LLP

(57) ABSTRACT

Disclosed are methods, apparatus, and systems, including computer program products, implementing and using techniques for a method for providing a game on demand over a data network, in a gaming machine. The gaming machine sends a request message for a game application over the data network. In a network mode, the gaming machine receives outputted results from an executed game application over a streaming channel of the data network for network-based game play. During the network-based game play, the game application is downloaded over a download channel of the data network. In a local mode, the gaming machine executes the downloaded game application independent of the network-based game play. The gaming machine switches instantaneously from the network mode to the local mode for machine-based game play, including maintaining a status of the network-based game play.

28 Claims, 7 Drawing Sheets

(56) References Cited

U.S. PATENT DOCUMENTS 4,689,742 A 8/1987 Troy et al.
4,856,787 A 8/1989 Itkis
4,868,900 A 9/1989 Mcguire
5,103,079 A 4/1992 Barakai et al.
5,136,644 A 8/1992 Audebert et al.
5,149,945 A 9/1992 Johnson et al.
5,155,837 A 10/1992 Liu et al.
5,265,874 A 11/1993 Dickinson et al.
5,286,062 A 2/1994 Greenwood et al.
5,290,033 A 3/1994 Bittner et al.
5,342,047 A 8/1994 Heidel et al.
5,348,299 A 9/1994 Clapper, Jr.
5,397,125 A 3/1995 Adams
5,410,703 A 4/1995 Nilsson et al.
5,421,009 A 5/1995 Platt
5,421,017 A 5/1995 Scholz et al.
5,466,920 A 11/1995 Nair et al.
5,473,772 A 12/1995 Halliwell et al.
5,487,544 A 1/1996 Clapper, Jr.
5,489,096 A 2/1996 Aron
5,491,812 A 2/1996 Pisello et al.
5,555,418 A 9/1996 Nilsson et al.
5,609,337 A 3/1997 Clapper, Jr.
5,611,730 A 3/1997 Weiss
5,643,086 A 7/1997 Alcorn et al.
5,645,485 A 7/1997 Clapper, Jr.
5,647,592 A 7/1997 Gerow
5,654,746 A 8/1997 McMullan, Jr. et al.
5,655,961 A 8/1997 Acres et al.
5,671,412 A 9/1997 Christiano
5,682,533 A 10/1997 Siljestroemer
5,684,750 A 11/1997 Kondoh et al.
5,688,174 A 11/1997 Kennedy
5,702,304 A 12/1997 Acres et al.
5,715,403 A 2/1998 Stefik
5,715,462 A 2/1998 Iwamoto et al.
5,741,183 A 4/1998 Acres et al.
5,749,784 A 5/1998 Clapper, Jr.
5,752,882 A 5/1998 Acres et al.
5,759,102 A 6/1998 Pease et al.
5,761,647 A 6/1998 Boushy
5,762,552 A * 6/1998 Vuong et al. .................... 463/25
5,766,076 A 6/1998 Pease et al.
5,768,382 A 6/1998 Schneier et al.
5,770,533 A * 6/1998 Franchi ........................... 463/42
5,779,545 A 7/1998 Berg et al.
5,779,549 A 7/1998 Walker et al.
5,797,795 A 8/1998 Takemoto et al.
5,800,269 A 9/1998 Holch et al.
5,819,107 A 10/1998 Lichtman et al.
5,820,459 A 10/1998 Acres et al.
5,828,843 A 10/1998 Grimm et al.
5,833,540 A 11/1998 Miodunski et al.
5,836,817 A 11/1998 Acres et al.
5,845,077 A 12/1998 Fawcett
5,845,090 A 12/1998 Collins et al.
5,845,902 A 12/1998 Takemoto
5,848,064 A 12/1998 Cowan
5,851,149 A 12/1998 Xidos et al.
5,855,515 A 1/1999 Pease et al.
5,870,723 A 2/1999 Pare, Jr. et al.
5,871,400 A 2/1999 Yfantis
5,876,284 A 3/1999 Acres et al.
5,885,158 A 3/1999 Torango et al.
5,896,566 A 4/1999 Averbuch et al.
5,902,983 A 5/1999 Crevelt et al.
5,905,523 A 5/1999 Woodfield et al.
5,925,127 A 7/1999 Ahmad
5,935,000 A 8/1999 Sanchez, III et al.
5,941,771 A 8/1999 Haste, III
5,943,241 A 8/1999 Nichols et al.
5,949,042 A 9/1999 Dietz, II et al.
5,970,143 A 10/1999 Schneier
5,971,855 A 10/1999 Ng
5,980,384 A 11/1999 Barrie
5,980,385 A 11/1999 Clapper, Jr.
5,987,376 A 11/1999 Olson et al.
5,999,808 A 12/1999 LaDue et al.
6,001,016 A 12/1999 Walker et al.
6,002,772 A 12/1999 Saito
6,003,013 A 12/1999 Boushy et al.
6,006,034 A 12/1999 Heath et al.
6,009,458 A 12/1999 Hawkins et al.
6,029,046 A 2/2000 Khan et al.
6,038,666 A 3/2000 Hsu et al.
6,047,128 A 4/2000 Zander
6,047,324 A 4/2000 Ford
6,048,269 A 4/2000 Burns et al.
6,052,512 A 4/2000 Peterson et al.
6,071,190 A 6/2000 Weiss et al.
6,098,837 A 8/2000 Izawa et al.
6,099,408 A 8/2000 Schneier et al.
6,104,815 A 8/2000 Alcorn et al.
6,106,396 A 8/2000 Alcorn et al.
6,113,098 A 9/2000 Adams
6,113,492 A 9/2000 Walker et al.
6,113,495 A 9/2000 Walker et al.
6,125,185 A 9/2000 Boesch
6,135,884 A 10/2000 Hedrick et al.
6,135,887 A 10/2000 Pease et al.
6,146,277 A 11/2000 Ikeda
6,149,522 A 11/2000 Alcorn et al.
6,154,878 A 11/2000 Saboff
6,159,098 A 12/2000 Stomiany et al.
6,165,072 A 12/2000 Davis et al.
6,169,976 B1 1/2001 Colosso
6,178,510 B1 1/2001 O'Connor et al.
6,183,362 B1 2/2001 Boushy
6,190,256 B1 2/2001 Walker et al.
6,193,152 B1 2/2001 Fernando et al.
6,193,608 B1 2/2001 Walker et al.
6,199,107 B1 3/2001 Dujari
6,219,836 B1 4/2001 Wells et al.
6,253,374 B1 6/2001 Dresevic et al.
6,254,483 B1 7/2001 Acres
6,264,561 B1 7/2001 Saffari et al.
6,270,410 B1 8/2001 DeMar et al.
6,280,328 B1 8/2001 Holch et al.
6,285,868 B1 9/2001 LaDue
6,285,886 B1 9/2001 Kamel et al.
6,293,865 B1 9/2001 Kelly et al.
6,302,793 B1 10/2001 Fertitta, III et al.
6,306,035 B1 10/2001 Kelly et al.
6,310,873 B1 10/2001 Rainis et al.
6,315,663 B1 11/2001 Sakamoto
6,317,827 B1 11/2001 Cooper
6,328,648 B1 12/2001 Walker et al.
6,340,331 B1 1/2002 Saunders et al.
6,343,990 B1 2/2002 Rasmussen et al.
6,347,996 B1 2/2002 Gilmore et al.
6,351,688 B1 2/2002 Nichols et al.
6,364,769 B1 4/2002 Weiss et al.
6,368,216 B1 4/2002 Hedrick et al.
6,368,219 B1 4/2002 Szrek et al.
6,371,852 B1 4/2002 Acres
6,402,618 B1 6/2002 Reed et al.
6,409,602 B1 6/2002 Wiltshire et al.
6,446,257 B1 9/2002 Pradhan et al.
6,449,687 B1 9/2002 Moriya
6,453,319 B1 9/2002 Mattis et al.
6,454,648 B1 9/2002 Kelly et al.
6,488,585 B1 12/2002 Wells et al.
6,508,709 B1 1/2003 Karmarkar
6,508,710 B1 1/2003 Paravia et al.
6,554,705 B1 4/2003 Cumbers
6,575,829 B2 6/2003 Coleman et al.
6,607,439 B2 8/2003 Schneier et al.
6,625,661 B1 9/2003 Baldwin, Jr.
6,638,170 B1 10/2003 Crumby
6,645,077 B2 11/2003 Rowe
6,645,078 B1 11/2003 Mattice
6,652,378 B2 11/2003 Cannon et al.
6,656,040 B1 * 12/2003 Brosnan et al. ................. 463/16
6,666,765 B2 12/2003 Vancura

(56) References Cited

U.S. PATENT DOCUMENTS

| | | | | |
|---|---|---|---|---|
| 6,682,423 | B2 | 1/2004 | Brosnan et al. | |
| 6,684,195 | B1 | 1/2004 | Deaton et al. | |
| 6,739,973 | B1 | 5/2004 | Lucchesi et al. | |
| 6,745,236 | B1 | 6/2004 | Hawkins et al. | |
| 6,749,502 | B2 | 6/2004 | Baerlocher | |
| 6,749,510 | B2 | 6/2004 | Giobbi | |
| 6,785,291 | B1 | 8/2004 | Cao et al. | |
| 6,805,634 | B1 | 10/2004 | Wells et al. | |
| 6,853,973 | B2 | 2/2005 | Mathews et al. | |
| 6,866,586 | B2 | 3/2005 | Oberberger et al. | |
| 6,875,110 | B1 | 4/2005 | Crumby | |
| 6,896,618 | B2 | 5/2005 | Benoy et al. | |
| 6,908,387 | B2 | 6/2005 | Hedrick et al. | |
| 6,910,079 | B2 | 6/2005 | Zimmermann et al. | |
| 6,913,531 | B1 | 7/2005 | Yoseloff | |
| 6,935,946 | B2 | 8/2005 | Yoseloff et al. | |
| 6,962,530 | B2 | 11/2005 | Jackson | |
| 6,988,267 | B2 | 1/2006 | Harris et al. | |
| 6,997,803 | B2 | 2/2006 | LeMay et al. | |
| 7,127,069 | B2 | 10/2006 | Nguyen | |
| 7,168,089 | B2 | 1/2007 | Nguyen et al. | |
| 7,318,775 | B2 | 1/2008 | Brosnan et al. | |
| 7,399,229 | B2 | 7/2008 | Rowe | |
| 7,438,643 | B2 | 10/2008 | Brosnan et al. | |
| 7,455,591 | B2 | 11/2008 | Nguyen | |
| 7,470,182 | B2 | 12/2008 | Martinek et al. | |
| 7,480,857 | B2 | 1/2009 | Benbrahim et al. | |
| 7,515,718 | B2 | 4/2009 | Nguyen et al. | |
| 7,618,317 | B2 | 11/2009 | Jackson | |
| 7,636,859 | B2 | 12/2009 | Little et al. | |
| 7,780,526 | B2 | 8/2010 | Nguyen et al. | |
| 7,785,204 | B2 | 8/2010 | Wells et al. | |
| 7,801,303 | B2 | 9/2010 | Dulac | |
| 7,828,654 | B2 | 11/2010 | Carter, Sr. | |
| 7,887,420 | B2 | 2/2011 | Nguyen et al. | |
| 7,951,002 | B1 | 5/2011 | Brosnan | |
| 7,972,214 | B2 | 7/2011 | Kinsley et al. | |
| 7,988,559 | B2 | 8/2011 | Yoseloff et al. | |
| 8,057,298 | B2 | 11/2011 | Nguyen et al. | |
| 8,287,379 | B2 | 10/2012 | Nguyen et al. | |
| 2001/0021666 | A1 | 9/2001 | Yoshida et al. | |
| 2001/0031663 | A1 | 10/2001 | Johnson | |
| 2001/0036854 | A1 | 11/2001 | Okuniewicz | |
| 2001/0036855 | A1 | 11/2001 | DeFrees-Parrott et al. | |
| 2001/0039210 | A1 | 11/2001 | St-Denis | |
| 2001/0044337 | A1 | 11/2001 | Rowe et al. | |
| 2001/0044339 | A1 | 11/2001 | Cordero et al. | |
| 2001/0053712 | A1 | 12/2001 | Yoseloff et al. | |
| 2002/0002075 | A1 | 1/2002 | Rowe | |
| 2002/0016202 | A1 | 2/2002 | Fertitta et al. | |
| 2002/0022516 | A1 | 2/2002 | Forden | |
| 2002/0028706 | A1 | 3/2002 | Barnard et al. | |
| 2002/0034980 | A1 | 3/2002 | Lemmons et al. | |
| 2002/0045477 | A1 | 4/2002 | Dabrowski | |
| 2002/0049909 | A1 | 4/2002 | Jackson et al. | |
| 2002/0050683 | A1 | 5/2002 | Hirota | |
| 2002/0071557 | A1 | 6/2002 | Nguyen | |
| 2002/0093136 | A1 | 7/2002 | Moody | |
| 2002/0107065 | A1 | 8/2002 | Rowe | |
| 2002/0111205 | A1 | 8/2002 | Beavers | |
| 2002/0116615 | A1 | 8/2002 | Nguyen et al. | |
| 2002/0132662 | A1 | 9/2002 | Sharp et al. | |
| 2002/0137217 | A1 | 9/2002 | Rowe | |
| 2002/0142844 | A1 | 10/2002 | Kerr | |
| 2002/0151359 | A1 | 10/2002 | Rowe | |
| 2002/0155887 | A1 | 10/2002 | Criss-Puszkiewicz et al. | |
| 2003/0009542 | A1 | 1/2003 | Kasal et al. | |
| 2003/0032485 | A1 | 2/2003 | Cockerille | |
| 2003/0036425 | A1 | 2/2003 | Kaminkow et al. | |
| 2003/0045356 | A1 | 3/2003 | Thomas | |
| 2003/0054878 | A1 | 3/2003 | Benoy et al. | |
| 2003/0064771 | A1 | 4/2003 | Morrow et al. | |
| 2003/0064805 | A1 | 4/2003 | Wells | |
| 2003/0069074 | A1 | 4/2003 | Jackson | |
| 2003/0074323 | A1 | 4/2003 | Catan | |
| 2003/0095791 | A1 | 5/2003 | Barton et al. | |
| 2003/0100371 | A1 | 5/2003 | Gatto et al. | |
| 2003/0157979 | A1 | 8/2003 | Cannon et al. | |
| 2003/0176213 | A1 | 9/2003 | LeMay et al. | |
| 2003/0186734 | A1 | 10/2003 | LeMay et al. | |
| 2003/0187853 | A1 | 10/2003 | Hensley et al. | |
| 2003/0188306 | A1 | 10/2003 | Harris et al. | |
| 2004/0002385 | A1 | 1/2004 | Nguyen | |
| 2004/0048671 | A1 | 3/2004 | Rowe | |
| 2004/0067794 | A1 | 4/2004 | Coetzee | |
| 2004/0092310 | A1 | 5/2004 | Brosnan et al. | |
| 2004/0137978 | A1* | 7/2004 | Cole et al. | 463/16 |
| 2004/0147314 | A1 | 7/2004 | LeMay et al. | |
| 2004/0152517 | A1 | 8/2004 | Hardisty et al. | |
| 2004/0166931 | A1 | 8/2004 | Criss-Puszkiewicz et al. | |
| 2004/0180722 | A1 | 9/2004 | Giobbi | |
| 2004/0242322 | A1* | 12/2004 | Montagna et al. | 463/29 |
| 2004/0248651 | A1 | 12/2004 | Gagner | |
| 2004/0259640 | A1 | 12/2004 | Gentles | |
| 2005/0054446 | A1 | 3/2005 | Kammler et al. | |
| 2005/0059470 | A1 | 3/2005 | Cannon | |
| 2005/0108519 | A1 | 5/2005 | Barton et al. | |
| 2005/0108769 | A1 | 5/2005 | Arnold et al. | |
| 2005/0113172 | A1* | 5/2005 | Gong | 463/42 |
| 2005/0120040 | A1 | 6/2005 | Williams et al. | |
| 2005/0137016 | A1 | 6/2005 | Enzminger et al. | |
| 2005/0153778 | A1 | 7/2005 | Nelson et al. | |
| 2005/0192099 | A1* | 9/2005 | Nguyen et al. | 463/42 |
| 2005/0216942 | A1 | 9/2005 | Barton | |
| 2005/0221898 | A1 | 10/2005 | Gatto et al. | |
| 2005/0288080 | A1 | 12/2005 | Lockton et al. | |
| 2006/0009273 | A2* | 1/2006 | Moshal | 463/17 |
| 2006/0019749 | A1 | 1/2006 | Merati et al. | |
| 2006/0035713 | A1* | 2/2006 | Cockerille et al. | 463/42 |
| 2006/0046855 | A1 | 3/2006 | Nguyen et al. | |
| 2006/0068871 | A1 | 3/2006 | Crawford et al. | |
| 2006/0073869 | A1 | 4/2006 | LeMay et al. | |
| 2006/0160621 | A1 | 7/2006 | Rowe et al. | |
| 2006/0247028 | A1 | 11/2006 | Brosnan et al. | |
| 2006/0258428 | A1 | 11/2006 | Blackburn et al. | |
| 2006/0264256 | A1 | 11/2006 | Gagner et al. | |
| 2006/0281541 | A1 | 12/2006 | Nguyen et al. | |
| 2007/0004506 | A1 | 1/2007 | Kinsley et al. | |
| 2007/0026935 | A1 | 2/2007 | Wolf et al. | |
| 2007/0032301 | A1 | 2/2007 | Acres et al. | |
| 2007/0060361 | A1 | 3/2007 | Nguyen et al. | |
| 2007/0060363 | A1 | 3/2007 | Nguyen et al. | |
| 2007/0178970 | A1 | 8/2007 | LeMay et al. | |
| 2007/0207852 | A1 | 9/2007 | Nelson et al. | |
| 2007/0243925 | A1 | 10/2007 | LeMay et al. | |
| 2007/0270213 | A1 | 11/2007 | Nguyen et al. | |
| 2008/0090654 | A1* | 4/2008 | Okada | 463/29 |
| 2008/0192058 | A1* | 8/2008 | Liu et al. | 345/473 |
| 2009/0209332 | A1 | 8/2009 | Soukup et al. | |
| 2009/0275407 | A1 | 11/2009 | Singh et al. | |
| 2010/0099491 | A1 | 4/2010 | Little et al. | |
| 2011/0218038 | A1 | 9/2011 | Kinsley et al. | |
| 2011/0281655 | A1 | 11/2011 | Nguyen et al. | |

FOREIGN PATENT DOCUMENTS

| | | | |
|---|---|---|---|
| EP | 0 689 325 | | 6/1995 |
| EP | 0 706 275 | | 4/1996 |
| EP | 0 715 245 | | 6/1996 |
| EP | 0 769 769 | | 4/1997 |
| EP | 0 841 615 | | 5/1998 |
| EP | 0 905 614 | | 3/1999 |
| EP | 1 004 970 | | 5/2000 |
| EP | 1 061 430 | | 12/2000 |
| EP | 1 074 955 | | 2/2001 |
| EP | 1 199 690 | | 4/2002 |
| EP | 1 231 577 | | 8/2002 |
| EP | 1 255 234 | | 11/2002 |
| EP | 1 291 048 | | 3/2003 |
| EP | 1391226 | B1 | 2/2004 |
| EP | 1 396 829 | | 3/2004 |
| EP | 1 414 534 | | 5/2004 |
| EP | 1 473 682 | | 11/2004 |
| EP | 1 895 483 | | 3/2008 |

(56) References Cited

FOREIGN PATENT DOCUMENTS

| | | |
|---|---|---|
| GB | 2 151 054 | 7/1985 |
| GB | 2 251 112 | 6/1992 |
| GB | 2 392 276 | 10/2004 |
| JP | 10-277243 | 10/1998 |
| JP | 2002-197332 | 7/2002 |
| RU | 2124230 | 12/1998 |
| RU | 17678 U1 | 4/2001 |
| WO | WO 95/24689 | 9/1995 |
| WO | WO 96/00950 | 1/1996 |
| WO | WO 97/30549 | 8/1997 |
| WO | WO 98/40141 | 9/1998 |
| WO | WO 99/00164 | 1/1999 |
| WO | WO 99/01188 | 1/1999 |
| WO | WO 00/67424 | 11/2000 |
| WO | WO 01/20424 | 3/2001 |
| WO | WO 01/99067 | 12/2001 |
| WO | WO02/01350 A1 | 1/2002 |
| WO | WO 02/05229 | 1/2002 |
| WO | WO 02/17251 | 2/2002 |
| WO | WO 02/21468 | 3/2002 |
| WO | WO 02/073501 | 9/2002 |
| WO | WO 02/077935 | 10/2002 |
| WO | WO 03/006129 | 1/2003 |
| WO | WO 03/019486 | 6/2003 |
| WO | WO 03/085613 | 10/2003 |
| WO | WO 2004/021290 | 3/2004 |
| WO | WO 2007/005290 | 1/2007 |
| WO | WO 2007/032879 | 3/2007 |
| WO | WO 2007/032888 | 3/2007 |
| WO | WO 2007/044175 | 4/2007 |
| WO | WO 2007/120450 | 10/2007 |
| WO | WO 2008/016610 | 2/2008 |
| WO | WO 2010/045004 | 4/2010 |

OTHER PUBLICATIONS

William R. Brosnan, "Using a Gaming Machines as a Server," U.S. Appl. No. 09/595,798, filed Jun. 16, 2000.

International Search Report dated Feb. 15, 2007, from corresponding International Application No. PCT/US2006/033185.

Written Opinion of the International Searching Authority dated Feb. 15, 2007, from corresponding International Application No. PCT/US2006/033185.

European Office Action, dated Jun. 2, 2008, from corresponding European Application No. 06813743.9.

Summons to Attend Oral Proceedings Communication from European Patent Office, dated Nov. 21, 2008, from corresponding European Application No. 06813743.9.

Chinese Office Action dated Sep. 25, 2009 issued in 200680033246.2.

U.S. Appl. No. 09/642,192, filed Aug. 18, 2000, LeMay et al.

U.S. Appl. No. 13/601,062, filed Aug. 31, 2012, Nguyen et al.

U.S. Appl. No. 13/188,281, filed Jul. 21, 2011, Nguyen et al.

U.S. Office Action dated Jul. 15, 2002 issued in U.S. Appl. No. 09/595,798.

U.S. Final Office Action dated Mar. 20, 2003 issued in U.S. Appl. No. 09/595,798.

U.S. Advisory Action dated May 21, 2003 issued in U.S. Appl. No. 09/595,798.

U.S. Office Action dated Jul. 1, 2003 issued in U.S. Appl. No. 09/595,798.

U.S. Office Action dated Jan. 14, 2004 issued in U.S. Appl. No. 09/595,798.

U.S. Final Office Action dated Jun. 3, 2004 issued in U.S. Appl. No. 09/595,798.

U.S. Office Action dated Jan. 28, 2005 issued in U.S. Appl. No. 09/595,798.

U.S. Final Office Action dated May 3, 2006 issued in U.S. Appl. No. 09/595,798.

U.S. Office Action dated Sep. 6, 2006 issued in U.S. Appl. No. 09/595,798.

U.S. Final Office Action dated Mar. 14, 2007 issued in U.S. Appl. No. 09/595,798.

U.S. Decision Pre-Appeal dated Sep. 14, 2007 issued in U.S. Appl. No. 09/595,798.

U.S. Notice of Petition Granted re Notice of Abandonment Vacated dated Jun. 24, 2009 issued in U.S. Appl. No. 09/595,798.

U.S. Office Action dated Sep. 16, 2009 issued in U.S. Appl. No. 09/595,798.

U.S. Notice of Allowance dated May 14, 2010 issued in U.S. Appl. No. 09/595,798.

U.S. Notice of Allowance dated Sep. 20, 2010 issued in U.S. Appl. No. 09/595,798.

U.S. Notice of Allowance dated Jan. 7, 2011 issued in U.S. Appl. No. 09/595,798.

U.S. Office Action dated Jul. 1, 2002 issued in U.S. Appl. No. 09/642,192.

U.S. Final Office Action dated Jan. 2, 2003 issued in U.S. Appl. No. 09/642,192.

U.S. Office Action dated Apr. 21, 2003 issued in U.S. Appl. No. 09/642,192.

U.S. Final Office Action dated Sep. 30, 2003 issued in U.S. Appl. No. 09/642,192.

U.S. Office Action dated Feb. 10, 2004 issued in U.S. Appl. No. 09/642,192.

U.S. Office Action dated Jul. 1, 2004 issued in U.S. Appl. No. 09/642,192.

U.S. Notice of Informal or Non-Responsive RCE Amendment dated Jan. 11, 2006 issued in U.S. Appl. No. 09/642,192.

U.S. Final Office Action dated Mar. 28, 2006 issued in U.S. Appl. No. 09/642,192.

U.S. Office Action dated Nov. 20, 2006 issued in U.S. Appl. No. 09/642,192.

U.S. Office Action dated Jan. 20, 2010 issued in U.S. Appl. No. 11/731,406.

U.S. Final Office Action dated Jul. 2, 2010 issued in U.S. Appl. No. 11/731,406.

U.S. Office Action dated Jan. 19, 2011 issued in U.S. Appl. No. 11/731,406.

U.S. Office Action dated Jun. 14, 2011 issued in U.S. Appl. No. 11/731,406.

U.S. Final Office Action dated Jan. 24, 2012 issued in U.S. Appl. No. 11/731,406.

U.S. Office Action dated Oct. 17, 2012 issued in U.S. Appl. No. 11/731,406.

U.S. Office Action dated May 18, 2004 issued in U.S. Appl. No. 10/097,507.

U.S. Final Office Action dated May 17, 2005 issued in U.S. Appl. No. 10/097,507.

U.S. Notice of Allowance dated Aug. 31, 2005 issued in U.S. Appl. No. 10/097,507.

U.S. Office Action dated Dec. 24, 2009 issued in U.S. Appl. No. 11/285,898.

U.S. Final Office Action dated May 26, 2010 issued in U.S. Appl. No. 11/285,898.

U.S. Office Action dated Oct. 5, 2011 issued in U.S. Appl. No. 11/285,898.

U.S. Final Office Action dated Jan. 26, 2012 issued in U.S. Appl. No. 11/285,898.

U.S. Office Action dated Mar. 8, 2010 issued in U.S. Appl. No. 11/497,740.

U.S. Office Action Final dated Aug. 12, 2010 issued in U.S. Appl. No. 11/497,740.

U.S. Office Action dated Jul. 22, 2011 issued in U.S. Appl. No. 11/497,740.

U.S. Final Office Action dated Dec. 12, 2011 issued in U.S. Appl. No. 11/497,740.

U.S. Office Action dated Jan. 7, 2010 issued in U.S. Appl. No. 11/881,190.

U.S. Final Office Action dated Jun. 11, 2010 issued in U.S. Appl. No. 11/881,190.

U.S. Office Action dated Nov. 24, 2010 issued in U.S. Appl. No. 11/881,190.

(56) References Cited

OTHER PUBLICATIONS

U.S. Notice of Allowance dated Jun. 23, 2011 issued in U.S. Appl. No. 11/881,190.
U.S. Notice of Allowance dated Sep. 9, 2011 issued in U.S. Appl. No. 11/881,190.
U.S. Office Action dated Jan. 11, 2012 issued in U.S. Appl. No. 13/188,281.
Third Party Submission dated Jan. 17, 2012 for U.S. Appl. No. 13/188,281.
U.S. Notice of Allowance dated Apr. 25, 2012 issued in U.S. Appl. No. 13/188,281.
U.S. Allowed Claims dated Apr. 25, 2012 for U.S. Appl. No. 13/188,281.
U.S. Office Action dated Apr. 4, 2006 issued in U.S. Appl. No. 10/230,604.
U.S. Final Office Action dated Oct. 12, 2006 issued in U.S. Appl. No. 10/230,604.
U.S. Notice of Panel Decision from Pre-Appeal Brief Review dated Jun. 19, 2007 issued in U.S. Appl. No. 10/230,604.
U.S. Office Action dated Mar. 18, 2008 issued in U.S. Appl. No. 10/230,604.
U.S. Final Office Action dated Aug. 18, 2008 issued in U.S. Appl. No. 10/230,604.
U.S. Office Action dated May 13, 2008 issued in U.S. Appl. No. 11/173,442.
U.S. Final Office Action dated Nov. 4, 2008 issued in U.S. Appl. No. 11/173,442.
U.S. Office Action dated Apr. 30, 2009 issued in U.S. Appl. No. 11/173,442.
U.S. Final Office Action dated Dec. 21, 2009 issued in U.S. Appl. No. 11/173,442.
U.S. Office Action dated Jul. 7, 2010 issued in U.S. Appl No. 11/173,442.
U.S. Office Action dated Dec. 8, 2010 issued in U.S. Appl. No. 11/173,442.
U.S. Notice of Allowance dated Apr. 14, 2011 issued in U.S. Appl. No. 11/173,442.
Third Party Submission dated Nov. 8, 2011 for U.S. Appl. No. 13/101,939.
U.S. Office Action dated Jul. 5, 2012 issued in U.S. Appl. No. 13/101,939.
U.S. Office Action dated Oct. 6, 2008 issued in U.S. Appl. No. 11/224,814.
U.S. Office Action dated Aug. 3, 2009 issued in U.S. Appl. No. 11/224,814.
U.S. Final Office Action dated Feb. 25, 2010 issued in U.S. Appl. No. 11/224,814.
U.S. Notice of Allowance dated Oct. 7, 2010 issued in U.S. Appl. No. 11/224,814.
U.S. Response to 312 Amendment dated Nov. 26, 2010 issued in U.S. Appl. No. 11/224,814.
U.S. Office Action dated Jul. 27, 2009 issued in U.S. Appl. No. 11/225,337.
U.S. Final Office Action dated Feb. 1, 2010 issued in U.S. Appl. No. 11/225,337.
U.S. Office Action dated Jul. 19, 2010 issued in U.S. Appl. No. 11/225,337.
U.S. Final Office Action dated Jan. 5, 2011 issued in U.S. Appl. No. 11/225,337.
U.S. Office Action dated Jul. 5, 2011 issued in U.S. Appl. No. 11/223,337.
U.S. Notice of Allowance dated Dec. 21, 2011 issued in U.S. Appl. No. 11/225,337.
U.S. Notice of Allowance dated Jun. 19, 2012 issued in U.S. Appl. No. 11/225,337.
U.S. Office Action dated Nov. 25, 2011 issued in U.S. Appl. No. 12/253,525.
U.S. Final Office Action dated Jul. 11, 2012 issued in U.S. Appl. No. 12/253,525.
PCT International Preliminary Examination Report dated Oct. 25, 2002 issued in PCT/US01/17896.
European Office Action dated Jan. 14, 2011 issued in EP 01 946 053.4-1238.
PCT International Written Opinion dated Mar. 31, 2003 issued in PCT/US01/25091 (WO2002/01725).
PCT International Preliminary Examination Report dated Jun. 27, 2003 issued in PCT/US01/25091 (WO2002/01725).
Australian Examiner's First Report dated Dec. 1, 2005 issued in AU2001283264.
Canadian Office Action dated Jul. 28, 2009 issued in CA 2,420,224.
Canadian Office Action dated Aug. 5, 2010 issued in CA 2,420,224.
Canadian Office Action dated Jun. 13, 2011 issued in CA 2,420,224.
European First Examination Report dated Feb. 10, 2009 issued in EP01962051.7.
Australian First Examination Report dated May 22, 2008 issued in AU2003200934.
Australian Examiner's First Report dated Jan. 31, 2011 issued in AU2009217419.
Canadian Office Action dated Jan. 21, 2011 issued in CA 2,421,541.
Canadian Office Action dated Jan. 31, 2012 issued in CA 2,421,541.
PCT International Search Report dated Nov. 13, 2003 issued in PCT/US2003/22180.
Australian Examiner's First Report dated Jun. 28, 2006 issued in AU2003251941.
Australian Examiner's Report No. 2 dated Aug. 8, 2006 issued in AU2003251941.
Australian Examiner's Report No. 3 dated Aug. 2, 2007 issued in AU2003251941.
Australian Examiner's First Report dated Aug. 7, 2009 issued in AU2008201281.
European Office Action dated Dec. 28, 2009 issued in EP03791582.4.
PCT Partial International Search Report dated Jan. 25, 2008 issued in PCT/US2007/017121.
PCT International Search Report dated Apr. 7, 2008 issued in PCT/US2007/017121 (WO2008/016610).
PCT Written Opinion dated Apr. 7, 2008 issued in PCT/US2007/017121 (WO2008/016610).
Australian Examiner's first report dated Jul. 28, 2011 issued in 2007281499.
Australian Examiner's report No. 2 dated Jan. 5, 2012 issued in 2007281499.
Australian Examiner's report No. 3 dated Mar. 27, 2012 issued in 2007281499.
Chinese Office Action dated Jul. 31, 2009 issued in CN200780036010.9.
Chinese First Office Action dated Nov. 25, 2010 issued in CN200780036010.9.
Chinese Second Office Action dated Jun. 16, 2011 issued in CN200780036010.9.
Chinese Third Office Action dated Oct. 26, 2011 issued in CN200780036010.9.
PCT International Search Report dated Oct. 11, 2006 issued in PCT/US2006/024129 (WO2007/005290).
PCT International Preliminary Report on Patentability and Written Opinion dated Jan. 9, 2008 issued in PCT/US2006/024129 (WO2007/005290).
AU Examiner's First Report dated Oct. 22, 2010 issued in 2006266236.
AU Examiner's Second Report dated Sep. 19, 2011 issued in 2006266236.
European Communication dated Apr. 14, 2008 issued in EP 06 773 680.1.
European Summons to Attend Oral Proceedings Pursuant to Rule 115(1)EPC dated Nov. 27, 2008 issued in EP 06 773 680.1-2221.
European Consultation with Examiner dated Dec. 18, 2008 issued in EP 06 773 680.1.
European Office Action re Result of Consultation on Preliminary Examination of Application Prior to Oral Proceedings dated Sep. 24, 2009 issued in EP 06 773 680.1.
European Minutes of Oral Proceedings dated Jan. 8, 2010 issued in EP 06 773 680.1.

(56) References Cited

OTHER PUBLICATIONS

European Decision to Refuse European Patent Application dated Jan. 8, 2010 issued in EP 06 773 680.1.
European Communication of Proceedings Before The Board of Appeal dated Jun. 4, 2010 issued in EP 06 773 680.1.
PCT International Preliminary Report on Patentability and Written Opinion dated Mar. 18, 2008 issued in PCT/US2006/033185 (WO/2007/032879).
Australian Examiner's first report dated May 27, 2011 issued in AU 2006291374.
Chinese Second Office Action dated Sep. 10, 2010 issued in CN200680033246.2.
European Result of Consultation and Brief Communication dated Apr. 28, 2009 issued in EP06813743.9.
PCT International Search Report dated Dec. 4, 2006 issued in PCT/US2006/033429.
PCT Written Opinion dated Dec. 4, 2006 issued in PCT/US2006/033429.
PCT International Preliminary Report on Patentability and Written Opinion dated Mar. 18, 2008 issued in PCT/US2006/033429.
Australian Examiner's First Report dated Nov. 18, 2010 issued in AU 2006291294.
Australian Examiner's Report No. 2 dated Feb. 14, 2011 issued in AU 2006291294.
Chinese Office Action dated Oct. 9, 2009 issued in CN2006800335028.
PCT International Preliminary Report on Patentability and Written Opinion dated Apr. 19, 2011 issued in PCT/US2009/058664.
EP Office Action dated May 8, 2012 issued in EP 09 793 079.6-2221.
"1,001 Windows 95 Tips, Operating System Shortcuts" (1995) Synapse Adaptive.com, Access and Productivity Tools, webpage retrieved from the Internet at http://www.synapseadaptive.com/tools/Win95%20keyboard%20shortcuts.html, on Dec. 8, 2009, 3 pages.
Adamec, Justene, (Sep. 9, 2005) "Checkraise: The Bots", Blogcritics.org News, [downloaded from http://blogcritics.org/archives/2005/09/09/093200.php on. Jun. 30, 2006], 3 pages.
CS Guard, Dec. 19, 2001, Half-Life www.olo.counter.com, webpage retrieved from the Internet at http://www.olo.counter-strike.pl/index.php?page=archive on Jun. 3, 2010, p. 3 of 5 pages.
Gaming Standards Association (2007), "G2S Basics," webpage retrieved from Internet at http://www.gamingstandards.com/pdfs/G2S_Sheet_final.pdf, on Sep. 5, 2008, 2 pages.
Gaming Standards Association (2007) (author unknown), "S2S Message Protocol v1.2 with Errata Sheet 1," Chapter 13, pp. 289-308. [online] retrieved from Internet on Sep. 23, 2008. http://www.gamingstandards.com/index.php?page=standards/free_downloads_standards.
Golle, Philippe et al., "Preventing Bots from Playing Online Games" ACM Computers in Entertainment, [Online] vol. 3, No. 3, Jul. 2005, pp. 1-10, XP002465544 Retrieved from the Internet: http://portal.acm.org/citation.cfm?doid=1077246.1077255.
Hauptmann, Steffen et al. (1996) "On-line Maintenance With On-The-Fly-Software Replacement," 1996 IEEE Proceedings, Third International Conference on Configurable Distributed Systems, No. 0-8 186-7395-8/96, 11 pgs (70-80).
HBP-10 Bill Dispenser, Multi-Country Platform (2001) JCM American, retrieved from the Internet at http://www.jcm-american.com/bill_dispensers.html on Sep. 20, 2001, 1 page.
HBP-5 Note Hopper (2001) JCM American, retrieved from the Internet at http://www.jcm-american.com/sub-note-hoppers.html on Sep. 20, 2001, 1 page.
Hiroaki Higaki, 8 page document entitled "Group Communication Algorithm for Dynamically Updating in Distributed Systems" Copyright 1994 IEEE International Conference on Parallel and Distributed Systems (pp. 56-62) 08-8 186-655-6/94, higaki@sdesun.slab.ntt.jp.
Hiroaki Higaki, 9 page document entitled "Extended Group Communication Algorithm for Updating Distributed Programs" Copyright 1996, IEEE, International Conference on Parallel and Distributed Systems, 0-81 86-7267-6/96, hig@takilab.k.dendai.as.jp.
"Noble Poker: Security & Integrity" (2005) advertisement from NoblePoker.com retrieved from the Internet at http://web.archive.org/web/20050512081751/http://www.noblepoker.com on May 12, 2005, XP-002465543, 2 pages.
Oracle8™ Enterprise Edition Partitioning Option (1999), Features Overview Feb. 1999, webpage for Oracle Corporation, retrieved from the Internet at www.oracle.com/collateral/ent_partitioning_fo_pdf, Feb. 1999, 8 pgs.
PcToolsTM Guides, "Manage the CPU Task Priority," www.pctools.com, webpage retrieved from the Internet at http://www.pctools.com/guides/registry/detail.1179, Sep. 16, 2002, 2 pgs.
Spielo Gaming International (2000) webpage advertisements entitled "Visions of Tomorrow" and "PowerStation5" retrieved from the Internet at http://www.spielo.com, dated Dec. 6, 2000, 7 pages.
Wang et al., "Casino technology player tracking and slot accounting systems," Database Inspec [Online] *The Institution of Electrical Engineers*, Stevenage, GB; Database accession No. 7228747; XP002231402; abstract. 1 page.
Webster's 1913 Dictionary, Definition of "Continuous" as shown in Webster's Online Dictionary, retrieved from the Internet at http://www.webster-dictionary.org/definition/ continuous on Mar. 2, 2009, 2 pgs.
Webster's 1913 Dictionary, Definition of "Regular" as shown in Webster's Online Dictionary, retrieved from the Internet at http://www.webster-dictionary.org/definition/ regular on Mar. 2, 2009, 3 pgs.
Windows 3.1 Resource Kit, Jul. 30, 2001, Microsoft.com, retrieved from the Internet at http://support.microsoft.com/kb/83433 on Feb. 8, 2009 and on Aug. 27, 2010, 47 pp.

* cited by examiner

METHOD AND SYSTEM FOR INSTANT-ON GAME DOWNLOAD

CROSS-REFERENCE TO RELATED APPLICATIONS

This application claims priority under U.S.C. §120 from and is a continuation of co-pending U.S. patent application Ser. No. 11/224,814, filed Sep. 12, 2005 and titled "METHOD AND SYSTEM FOR INSTANT-ON GAME DOWNLOAD", which is hereby incorporated by reference.

This application relates to commonly assigned, co-pending U.S. patent application Ser. No. 11/225,337, filed Sep. 12, 2005 and titled "DISTRIBUTED GAME SERVICES", which is hereby incorporated by reference.

BACKGROUND OF THE INVENTION

The present disclosure relates to gaming machines and networks and, more particularly, to games-on-demand systems.

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

Various games, particularly the Class II and Class III categories of games, can be implemented as server-based games in a server-client system. Server-based games are generally those in which the games and capabilities of a gaming terminal depend on a central server. The terminal may download games from the central server or may rely on the central server to run the games.

Game applications are becoming more sophisticated and, hence, larger in size, to use the expanding capabilities of central servers and gaming terminals. In addition, the number of different game applications available for play is always increasing, as game developers attempt to meet player demand for various styles of games. There are so many available games; it is impractical to store all of these games on a gaming machine. Thus, the notion of server-based games is becoming a necessity in some casinos and hotels.

In a games-on-demand system, a player can operate a gaming terminal to request a particular game for playing. In a download configuration, the requested game is downloaded from the central server to the gaming terminal, and then executed on the gaming terminal. In a server-based configuration, on the other hand, the requested game is executed on the server, and the player interacts with the server to play the game. For example, U.S. Pat. No. 5,779,549, "Database Driven Online Distributed Tournament System" and U.S. Pat. No. 6,409,602, "Slim Terminal Gaming System" describe server-based configurations where no processing occurs on the gaming machine. That is, the game is executed on the central server, and the gaming machine operates as an IO device for a player to interact with the central server. The game play, meter tracking, and other game functions are all carried out on the central server.

In implementing a games-on-demand system, both the download configuration and the server-based configuration described above have their respective drawbacks. In a download configuration, the gaming terminal is susceptible to long delays while a requested game is retrieved and downloaded from the central server, and then authenticated, before game play can begin. These delays are often attributable to the large and ever increasing size of game applications, described above. In a server-based configuration, a drawback is that the operability of the gaming terminals is entirely network-dependent. That is, when the central server malfunctions, or other network problems interfere with the connection between the gaming terminals and the central server, all of the gaming terminals are affected. Game play can be hindered on all of the gaming terminals, due to their dependence on the central server to execute the game.

Thus, it is desirable to provide a gaming system which eliminates both the delay associated with download configurations, and the network-dependence associated with server-based configurations.

SUMMARY OF THE INVENTION

Disclosed are methods, apparatus, and systems, including computer program products, implementing and using techniques for a method for providing a game on demand over a data network, in a gaming machine. In one aspect of the present invention, the gaming machine sends a request message for a game application over the data network. In a network mode, the gaming machine receives outputted results from an executed game application over a streaming channel of the data network for network-based game play. During the network-based game play, the game application is downloaded over a download channel of the data network. In a local mode, the gaming machine executes the downloaded game application independent of the network-based game play. The gaming machine switches instantaneously from the network mode to the local mode for machine-based game play, including maintaining a status of the network-based game play.

All of the foregoing methods, along with other methods of aspects of the present invention, may be implemented in software, firmware, hardware and combinations thereof. For example, the methods of aspects of the present invention may be implemented by computer programs embodied in machine-readable media and other products.

Aspects of the invention may be implemented by networked gaming machines, game servers and other such devices. These and other features and benefits of aspects of the invention will be described in more detail below with reference to the associated drawings.

DETAILED DESCRIPTION OF THE EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Figure 1:
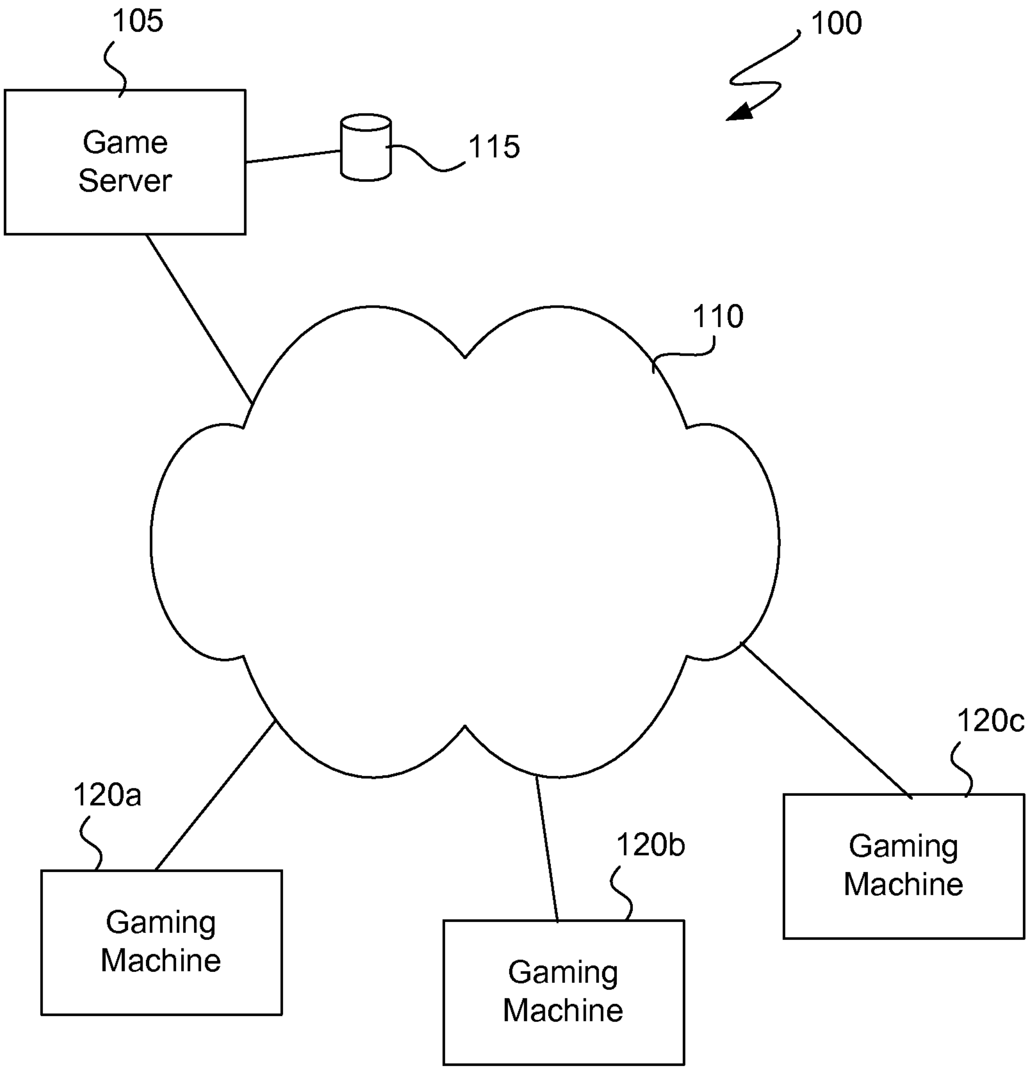
FIG. 1 shows a block diagram of a gaming system 100 for providing a game on demand over a data network 110, in accordance with one embodiment of the invention.

FIG. 1 shows a block diagram of a gaming system 100 for providing a game on demand over a data network 110 in accordance with one embodiment of the invention. Examples of data network 110 include a Local Area Network (LAN), a Wide Area Network (WAN) such as the Internet, and various combinations thereof. Other suitable communications networks can be used to define data network 110 within the spirit and scope of the present invention. In FIG. 1, the system 100 includes a game server 105 in communication with data network 110. Game server 105 can be constructed with various combinations of hardware and software, as described below. In FIG. 1, game server 105 is also in communication with a storage medium 115, such as a database, for storing game applications and game data. In one embodiment, storage medium 115 is external to game server 105, as shown. In another embodiment, storage medium 115 is a memory device integrated with game server 105. Game server 105 controls the storing and retrieving of game applications to and from the storage medium 115 for the operations described below. In FIG. 1, the system 100 further includes gaming machines 120*a*, 120*b*, and 120*c*. The gaming machines 120*a*, 120*b*, and 120*c* can be constructed of various combinations of hardware and software, as described below, depending on the desired implementation. The gaming machines 120*a-c* of system 100 communicate and interact with game server 105 over data network 110.

Figure 2:
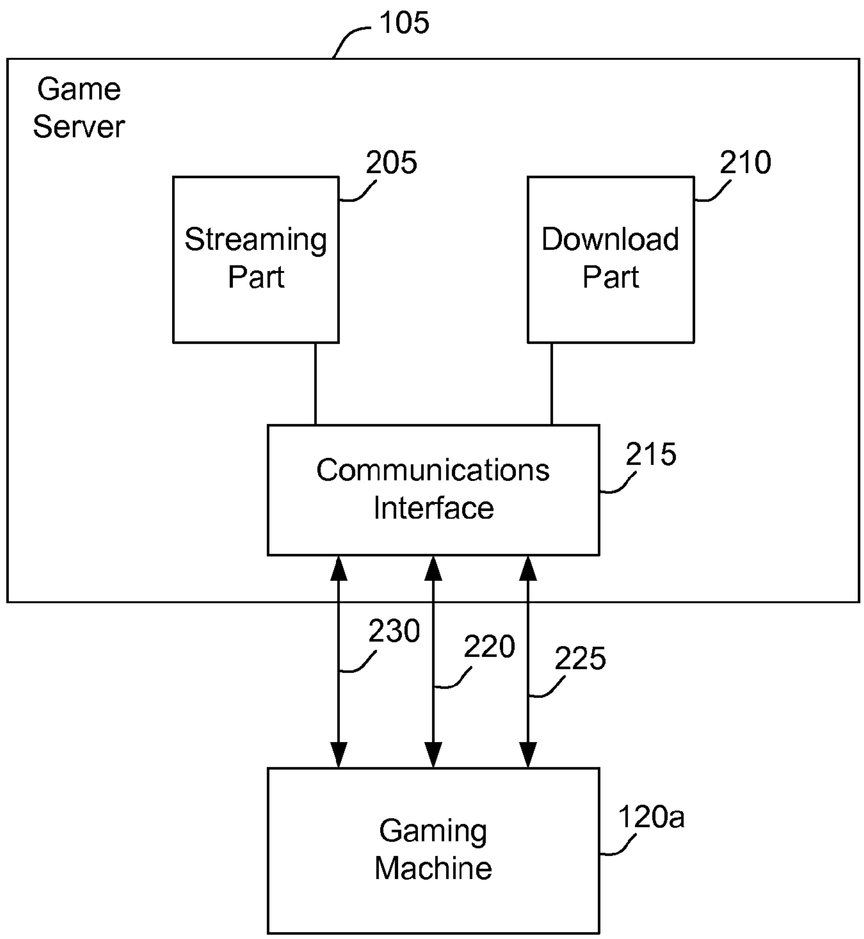
FIG. 2 shows a block diagram of game server 105 in communication with a gaming machine 120*a*, in accordance with one embodiment of the invention.

FIG. 2 shows a block diagram of game server 105 in communication with a gaming machine 120*a*, in accordance with one embodiment of the invention. The hardware and software implementing game server 105 is described below. As part of this hardware, software, or combination thereof, game server 105 includes a streaming part 205 and a download part 210 that interact with an appropriate communications interface 215 in game server 105, as shown. The communications interface 215 provides a network endpoint on data network 110 so that game server 105 can interact with other systems and devices on data network 110. Those skilled in the art will appreciate that, in an alternative embodiment, the communications interface 215 with which streaming part 205 and download part 210 communicate is situated external to game server 105.

In FIG. 2, game play generally begins responsive to a request message sent from gaming machine 120*a* over an appropriate channel 230 of data network 110 to game server 105. Streaming part 205 retrieves a game application and any associated game data from 115, when the game application is not already stored in memory within game server 105. Streaming part 205 handles execution of the game application, including processing user inputted data received from gaming machine 120*a* over an appropriate communications channel of data network 110, such as channel 230 or 220, and outputting of results from the executing game application over a streaming channel 220 of data network 110 to gaming machine 120*a*. When a game is executing on game server 105 by streaming part 205, the system 100 of FIG. 1 is operating in "network mode."

In FIG. 2, download part 210 of game server 105 handles downloading of the game application through communications interface 215 over a download channel 225 of data network 110 to gaming machine 120*a*. Generally, the game application downloaded by download part 210 is the same application executed by streaming part 205. The downloading operation performed by download part 210 is generally initiated when execution of the game application by streaming part 205 commences, or shortly thereafter, and continues for the necessary amount of time while results are output to gaming machine 120*a* over streaming channel 220.

Those skilled in the art should appreciate that the channels 220, 225 and 230, as shown in FIG. 2, are one possible implementation of a communications link established between game server 105 and gaming machine 120*a* over data network 110 for providing the transfer of various data and messages as described above. In one embodiment, two or more of the channels 220-230 are implemented as part of the same physical communications connection. In another embodiment, the channels are implemented as individual communications connections physically separated from one another. In yet another embodiment, individual channels 220-230 are implemented in separate data networks. Other configurations of channels and connections or links for performing the same data transfer operations described above are contemplated within the spirit and scope of the present invention. In addition, those skilled in the art will appreciate that the outputted results of the executing game application in streaming part 205 can be sent and received during or after execution of the game application on game server 105.

Figure 3:
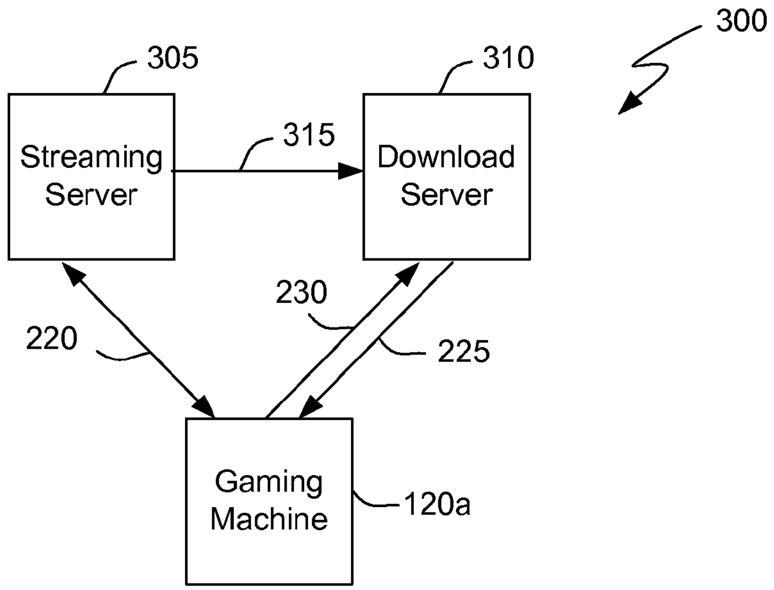
FIG. 3 shows a block diagram of a gaming system 300, in accordance with one embodiment of the invention, for providing a game on demand over a data network.

FIG. 3 shows a system 300 as an alternative embodiment to game server 105. In system 300, two separate server computers are provided to perform the functions of streaming part 205 and download part 210 of game server 105. These server computers in system 300 include a streaming server 305 and a download server 310 to perform the same respective functions of streaming parts 205 and 210. That is, streaming server 305 executes the game application and streams outputted results from the application to gaming machine 120*a* over streaming channel 220. Download server 310 receives the request message from gaming machine 120*a* over channel 230 and handles downloading of the game application over download channel 225 to gaming machine 120*a*. While not shown in FIG. 3, suitable communications interfaces similar to interface 215 in FIG. 2 are provided for each of the servers 305 and 310 to communicate with gaming machine 120 over data network 110.

In FIG. 3, while the communication channels 220, 225 and 230 are established as illustrated for this embodiment, alternative configurations are contemplated within the spirit and scope of the present invention. For example, in one embodiment, the communications channel 230 is established between gaming machine 120*a* and streaming server 305 such that the request message from gaming machine 120*a* is sent to streaming server 305. Responsive to receiving the request message, streaming server 305 then begins execution of the game application, as described above, and communicates the request message or a suitable signal to download server 310 over communications channel 315 established between streaming server 305 and download server 310, notifying download server 310 to begin downloading the game application over download channel 225.

Figure 4:
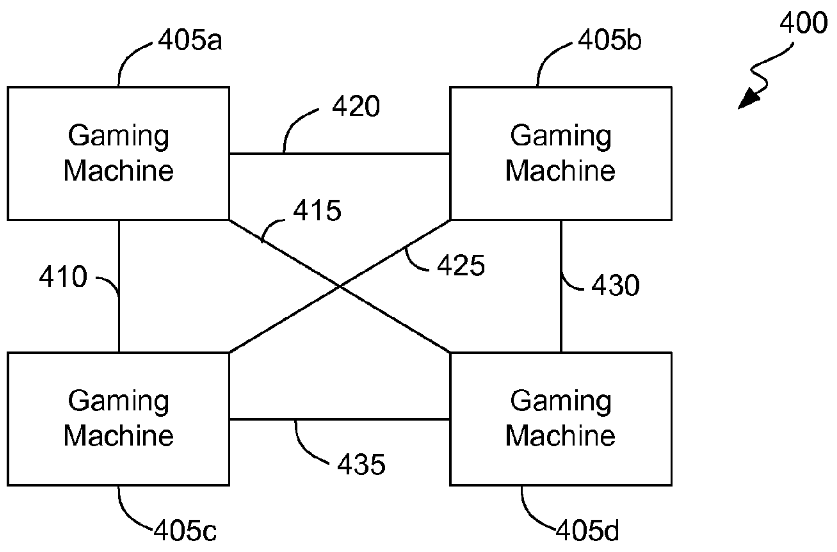
FIG. 4 shows a block diagram of a gaming system 400, in accordance with one embodiment of the present invention, for providing a game on demand over a data network.

FIG. 4 shows a gaming system 400 constructed according to another embodiment of the present invention for providing a game on demand over a data network. In FIG. 4, the system 400 includes a plurality of gaming machines 405*a*, 405*b*, 405*c* and 405*d*. These gaming machines are in communication with one another in a peer-to-peer configuration over a suitable data network such as network 110 of FIG. 1. That is, communications links, i.e. channels 410-435 can be established as shown between one gaming machine, such as machine 405*a*, and one or more of the other gaming machines 405*b-d* in the system 400.

In FIG. 400, one or more of the gaming machines 405*a-d* are configured to operate the same as game server 105 of FIG. 2, rather than coupling a separate game server computer to the network. The peer-to-peer configuration of system 400 enables this feature. Those skilled in the art will appreciate that the software, hardware or combination thereof within one or more of the gaming machines 405*a-d* of system 400, described in greater detail below, implements streaming part 205 and download part 210 of FIG. 2. Thus, when a user selects a game to play on a selected gaming machine, such as machine 405*a*, and that machine does not have a copy of the requested game application residing on that machine 405*a*, the gaming machine 405*a* sends a request to one or more of the other machines 405*b-d* in the system 400 for the requested game application. Then, the gaming machine having the requested game application interacts with the requesting game machine 405*a* in the same manner that the game server 105 or servers 305 and 310 interact with machine 120*a* as described above with respect to FIGS. 1 and 3.

Using the configuration of FIG. 4, in one example, the game server or servers of FIGS. 1 and 3 can be effectively removed from the system while maintaining the same functionality. In one example, a plurality of game applications are distributed among the various gaming machines 405*a-d* in the system 400. If possible, certain applications are installed on the particular machines where users will likely request those games. When a user requests a particular game application on a given machine, such as gaming machine 405*a*, and that game application is not already stored in memory on or accessible by gaming machine 405*a*, the gaming machine 405*a* sends a request message to other gaming machines in the network.

In another embodiment, similar to the system 100 of FIG. 1, the request message from a gaming machine 120*a* is sent to a game server such as game server 105. Responsive to receiving this request message, game server 105 broadcasts the request message to all of the other gaming machines 120*b-c* in the system 100. Then, the gaming machine having the requested game application, such as machine 120*b*, begins executing the requested application and streaming the outputted results directly to gaming machine 120*a* over a suitable communications channel of network 110. In addition, the gaming machine 120*b* having the requested application begins downloading that application to the requesting gaming machine 120*a*, functioning the same as game server 105 or the combination of servers 305 and 310.

Figure 5:
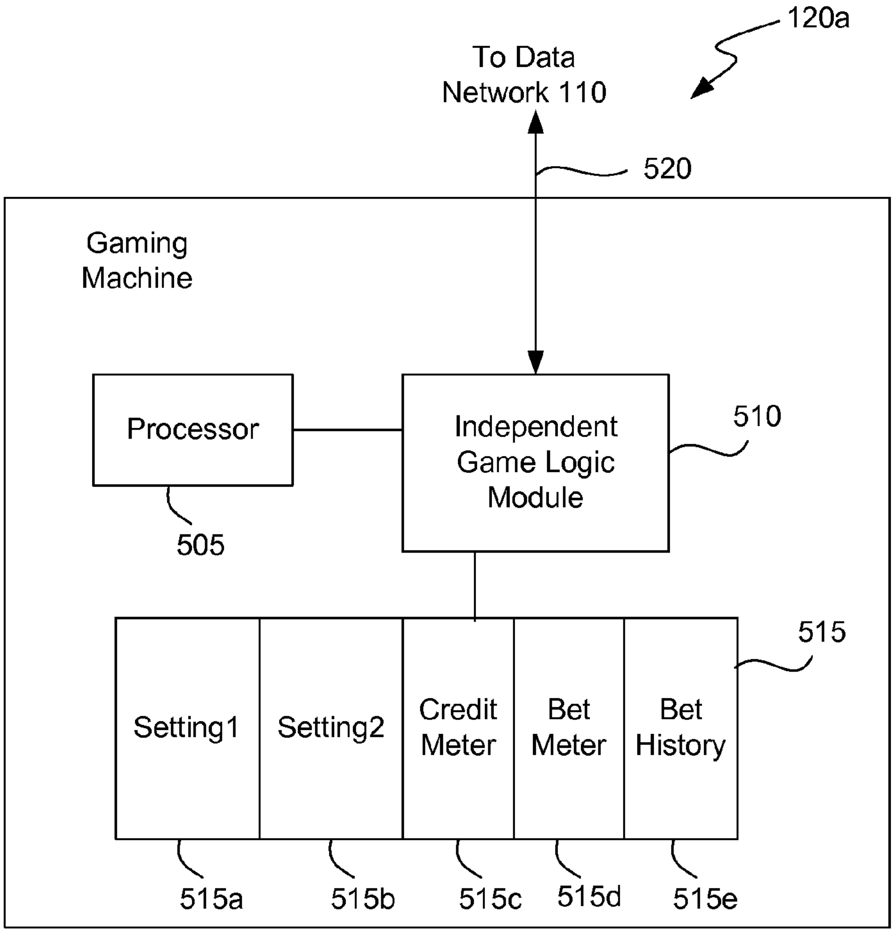
FIG. 5 shows a block diagram of a gaming machine 120*a*, in accordance with one embodiment of the present invention.

FIG. 5 shows a gaming machine 120*a* constructed according to one embodiment of the present invention. In FIG. 5, gaming machine 120*a* includes a suitable processor 505, as described below. In addition, gaming machine 120*a* includes an independent game logic module 510 in communication with a suitable memory device or medium 515 configured as shown in FIG. 5. The independent game logic module 510 communicates with a game server or other gaming machine functioning as the game server, as described above in FIG. 4, over a suitable network connection 520 to data network 110.

During network mode, also referred to as server mode, when the requested game application is executing on a game server 105 or gaming machine external to the requesting gaming machine 120*a*, state information for the executing game application, referred to herein as game settings, are maintained in the processor-readable storage medium 515. These settings will vary, depending on the particular game being played as well as the stage of the game. The configuration of these settings in storage in medium 515 can be structured as desired for the particular implementation, as will be understood by those skilled in the art.

In one example, as shown in FIG. 5, the state information stored in medium 505 for the game being executed includes game settings 515*a* and 515*b*. In one example, these game settings are controlled and set with game IO logic implemented with suitable hardware, software or any combination thereof in independent game logic module 510 of FIG. 5. Game settings 515*a* and 515*b*, in one example, are in XML format. In another example, one or more of the settings 515*a* and 515*b* are in HTML format. As shown in FIG. 5, the game settings stored in storage medium 515 further include a credit meter 515*c* maintained for the executing application, a bet meter 515*d*, and bet history information 515*e*. Other suitable bet configurations can be stored in memory 515 and controlled by independent game logic module 510, depending on the desired implementation. When the gaming machine switches from network mode to local mode, that is, when the game application has been downloaded and is executing on the gaming machine 120*a*, the game settings for the downloaded game application are set to the current game settings for the executed application. In other words, the game settings 515*a-e* in storage medium 515 at the time of switching from network mode to local mode are maintained and used by the downloaded game application. In this way, the status of the game is transferred. By transferring the state information, the gaming machine can switch instantaneously from network-based game play to network-based game play, providing seamless and uninterrupted enjoyment for the player. Then, the game settings for the executed game application are used and updated by the downloaded game application as appropriate during execution in local mode.

In FIG. 5, the initial game settings for the executed game application on the game server or other external gaming machine can be downloaded to gaming machine 120*a* over a suitable channel such as streaming channel 220 of FIG. 2. Further game settings updates and additional game settings information can similarly be sent from the game server 105 or other gaming machine over streaming channel 220 as the game is played.

Figure 6:
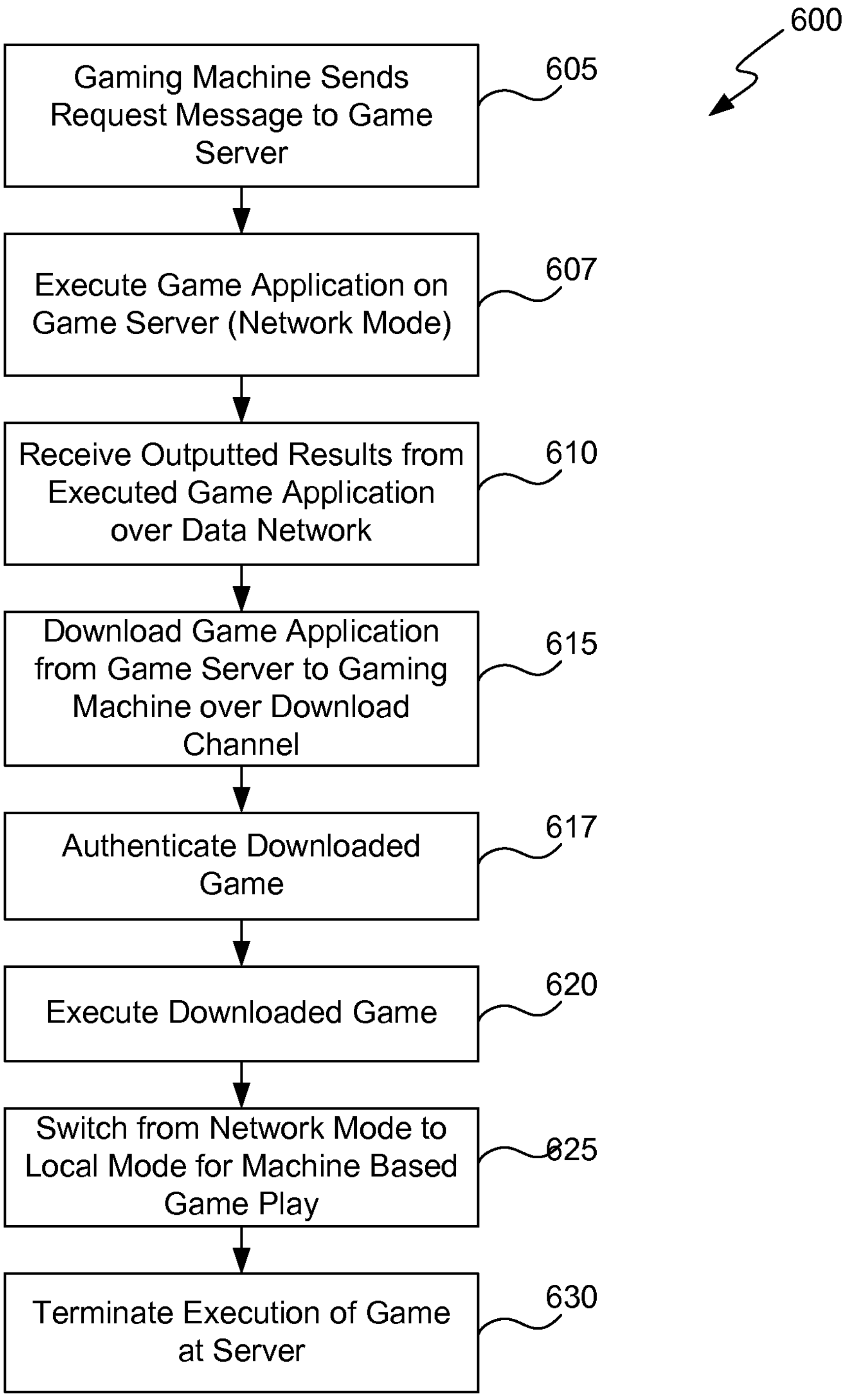
FIG. 6 shows a flow diagram of a method 600 for providing a game on demand over a data network, performed in accordance with one embodiment of the present invention.

FIG. 6 shows a flow diagram of a method 600 for providing a game on demand over a data network, performed in accordance with one embodiment of the present invention. FIG. 6 is described with respect to FIGS. 1 and 2. Those skilled in the art will appreciate that the method 600 is equally applicable to the systems of FIGS. 3 and 4. That is, the operation of streaming part 205 in game server 105 of FIG. 2 is the same as streaming server 305 of system 300, and download part 210 is implemented in download server 310. In another embodiment, in FIG. 4, the streaming part 205 and download part 210 of game server 105 are implemented in one or more gaming machines 405*a-d* of the peer-to-peer configuration of system 400, as described above.

In step 605 of FIG. 6, gaming machine 120*a* sends a request message over a suitable channel of data network 110, such as communications channel 230, to game server 105. Often the request message is sent responsive to selection of the particular requested game application at the gaming machine by the player. This selection can be made using any of a variety of input devices and interfaces, as described below. Game server 105 receives the request message at communications interface 215 and processes the request message accordingly. In particular, responsive to receiving the request message, in step 607, streaming part 205 of game server 105 begins executing the game application and streaming the output data or results from the executing game application back to gaming machine 120*a* over streaming channel 220 of data network 110. In FIG. 1, in one embodiment, game applications executable by game server 105 are stored on a suitable processor-readable storage medium 115 in communication with game server 105. Responsive to receiving the request message, in step 607 of FIG. 6, the game server 105 retrieves the requested game application from storage medium 115 for execution.

When output data is being generated and streamed from game server 105 to gaming machine 120*a*, this is referred to herein as a "network mode" or "server mode" of operation. Network mode and server mode generally refer to the execution of the requested game application on game server 105 or any other machine or device external to gaming machine 120*a*, for network-based or server-based game play on gaming machine 120*a*. In network mode, gaming machine 120*a* sends input data and selections, as appropriate for the particular game being executed on game server 105 or another device over the communications channel 230 or another suitable channel of data network 110. As used herein, "server-based game play" refers to execution of a game application external to the gaming machine 120*a* on a server such as game server 105 or one or more streaming servers 305 as shown in FIG. 3, and providing output of that executed game application to the requesting gaming machine over data network 110. "Network-based game play" refers to the execution of the game application on any machine, server, or other device situated external to the requesting gaming machine and providing output of that executed game application to the requesting gaming machine over data network 110. "Machine-based game play" refers to execution of the game application by the gaming machine 120*a* itself.

In step 610 of FIG. 6, the outputted results from the game application executing on game server 105 are received over streaming channel 220 of data network 110 by the gaming machine 120*a* for network-based game play. The outputted results received from the game server 105 by gaming machine 120*a* can be in a variety of formats, and often include video and audio data as appropriate for the particular game being played. Using appropriate user interfaces and input devices on gaming machine 120*a*, as described below, the user interacts with game server 105 to play the executing game application in network mode.

In step 615, responsive to receiving the request message from gaming machine 120*a*, generally at some time around the beginning of network-based game play, or shortly thereafter, the download part 210 of game server 105 begins downloading a downloadable form of the same game application executing on streaming part 205 over download channel 225 of data network 110. Following step 615, step 617 includes authentication of the downloaded game application by gaming machine 120*a*. The game application can be authenticated using any of a variety of techniques, as will be appreciated by those skilled in the art.

In step 620 of FIG. 6, after download is complete, the gaming machine 120*a* switches from network mode to local mode. This includes executing the downloaded game application on processor 505 of the gaming machine 120*a* independent of the playing of the game application executed on streaming part 205 of game server 105 in network mode. In step 625, the gaming machine 120*a* switches instantaneously from server mode to local mode from machine-based game play; that is, the machine switches from the game executing on streaming part 205 to the game executing on gaming machine 120*a*. This includes maintaining a status of the network-based game play, including maintaining game settings and other state information in memory 515 associated with the executed game application on game server 105. That is, the current game settings for the network-based game play are transferred or otherwise applied to the downloaded game application for machine-based game play. In this way, game play continues in an uninterrupted fashion. That is, by transferring the game settings of the executed application on game server 105 when machine-based game play begins, any history information and other state information of the network-based game play is maintained, and game play continues without any delay or resetting of state information or parameters. The settings are consistent, and the user is unaware that any such switching has taken place. The user perceives game play as being in a single session, and is unaware of and does not need to be concerned with the server or machine on which the game application is actually executed. The user can focus on interacting with the game itself and the enjoyment of the gaming experience.

In FIG. 6, following step 625, after switching from server mode or network mode to local mode, in step 630, the game server 105, namely streaming part 205, can terminate execution of the game application at the game server 105.

In one embodiment, a lower bandwidth version of the game application is run in network mode. For example, one game application normally outputs video data at 80 frames per second. In step 607 of FIG. 6, in network mode, the server executes the game, but only renders 30 frames per second. After the game application has been downloaded, in step 620, the downloaded game application is executed at full speed, i.e., 80 frames per second. In this way, the apparatus and methods described herein can compensate for bandwidth limitations and other delay factors of the network that would otherwise impair the game play experience.

Some games of the present invention can be implemented, in part, in a gaming device such as the gaming machines described herein according to game data received from a game server, such as the game servers described herein. The gaming device may receive such game data through data network 110, such as a dedicated gaming network and/or a public data network such as the Internet.

Figure 7:
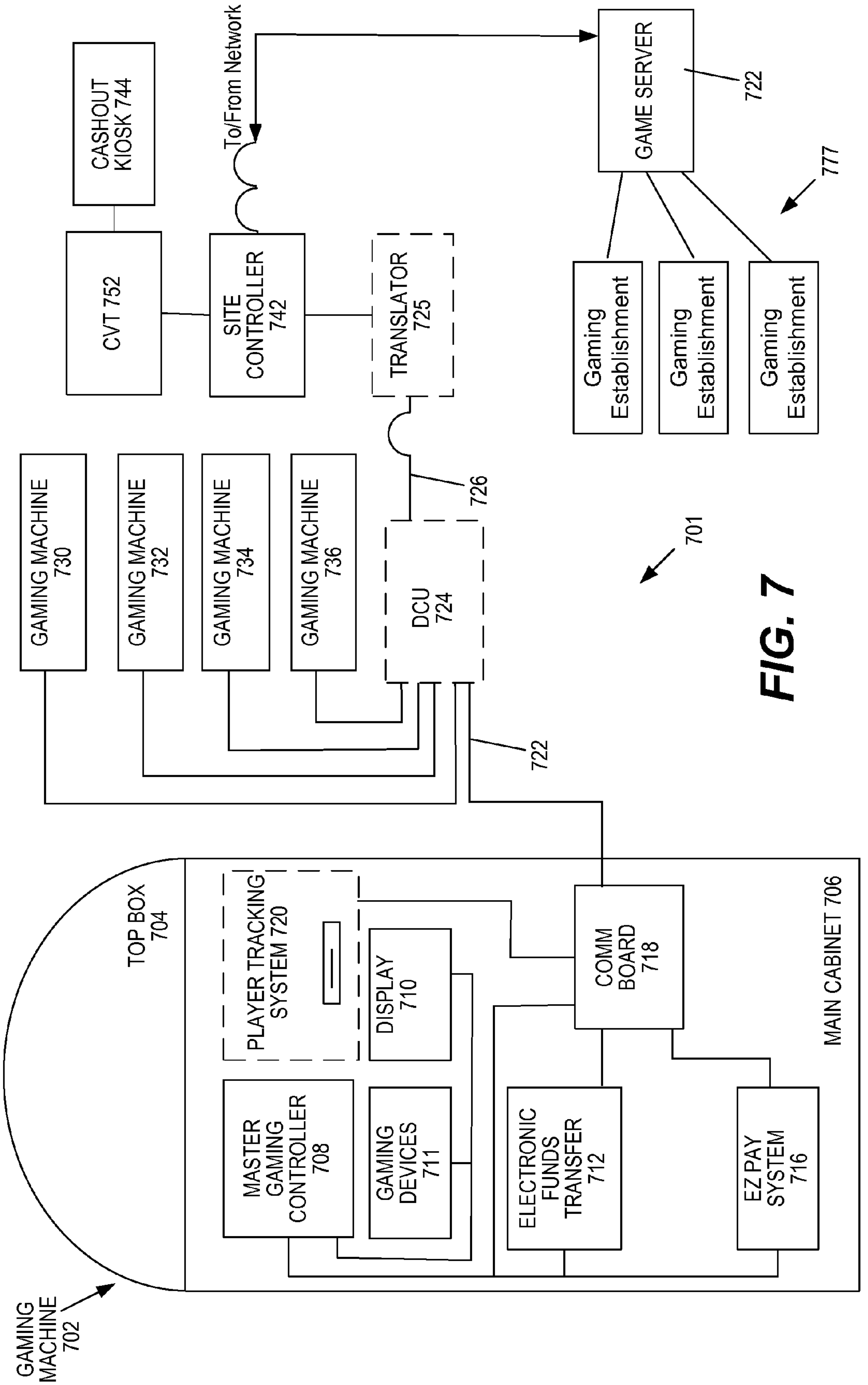
FIG. 7 is a block diagram of a number of gaming machines in a gaming network that may be configured to implement some methods of the present invention.

One example of a gaming system, also referred to herein as a gaming network, that may be used to implement methods performed in accordance with embodiments of the invention is depicted in FIG. 7. Gaming establishment 701 could be any sort of gaming establishment, such as a casino, a card room, an airport, a store, etc. In this example, gaming network 777 includes more than one gaming establishment, all of which are networked to game server 722.

Here, gaming machine 702, and the other gaming machines 730, 732, 734, and 736, include a main cabinet 706 and a top box 704. The main cabinet 706 houses the main gaming elements and can also house peripheral systems, such as those that utilize dedicated gaming networks. The top box 704 may also be used to house these peripheral systems.

The master gaming controller 708 controls the game play on the gaming machine 702 according to instructions and/or game data from game server 722 or independent game logic module 510 and receives or sends data to various input/output devices 711 on the gaming machine 702. In one embodiment, master gaming controller 708 includes processor 505 and independent game logic module 510 of gaming machine 120*a* as described above. The master gaming controller 708 may also communicate with a display 710.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 708 may also communicate with EFT system 712, EZPay™ system 716 (a proprietary cashless ticketing system of the present assignee), and player tracking system 720. The systems of the gaming machine 702 communicate the data onto the network 722 via a communication board 718.

It will be appreciated by those of skill in the art that the present invention could be implemented on a network with more or fewer elements than are depicted in FIG. 7. For example, player tracking system 720 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 724 and translator 725 are not required for all gaming establishments 701. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 742 provides this function for gaming establishment 701. Site controller 742 is connected to a central system and/or other gaming establishments via one or more networks, which may be public or private networks. Among other things, site controller 742 communicates with game server 722 to obtain game data, such as ball drop data, bingo card data, etc.

In the present illustration, gaming machines 702, 730, 732, 734 and 736 are connected to a dedicated gaming network 722. In general, the DCU 724 functions as an intermediary between the different gaming machines on the network 722 and the site controller 742. In general, the DCU 724 receives data transmitted from the gaming machines and sends the data to the site controller 742 over a transmission path 726. In some instances, when the hardware interface used by the gaming machine is not compatible with site controller 742, a translator 725 may be used to convert serial data from the DCU 724 to a format accepted by site controller 742. The translator may provide this conversion service to a plurality of DCUs.

Further, in some dedicated gaming networks, the DCU 724 can receive data transmitted from site controller 742 for communication to the gaming machines on the gaming network. The received data may be, for example, communicated synchronously to the gaming machines on the gaming network.

Here, CVT 752 provides cashless and cashout gaming services to the gaming machines in gaming establishment 701. Broadly speaking, CVT 752 authorizes and validates cashless gaming machine instruments (also referred to herein as "tickets" or "vouchers"), including but not limited to tickets for causing a gaming machine to display a game result and cashout tickets. Moreover, CVT 752 authorizes the exchange of a cashout ticket for cash. These processes will be described in detail below. In one example, when a player attempts to redeem a cashout ticket for cash at cashout kiosk 744, cash out kiosk 744 reads validation data from the cashout ticket and transmits the validation data to CVT 752 for validation. The tickets may be printed by gaming machines, by cashout kiosk 744, by a stand-alone printer, by CVT 752, etc. Some gaming establishments will not have a cashout kiosk 744. Instead, a cashout ticket could be redeemed for cash by a cashier (e.g. of a convenience store), by a gaming machine or by a specially configured CVT.

Figure 8:
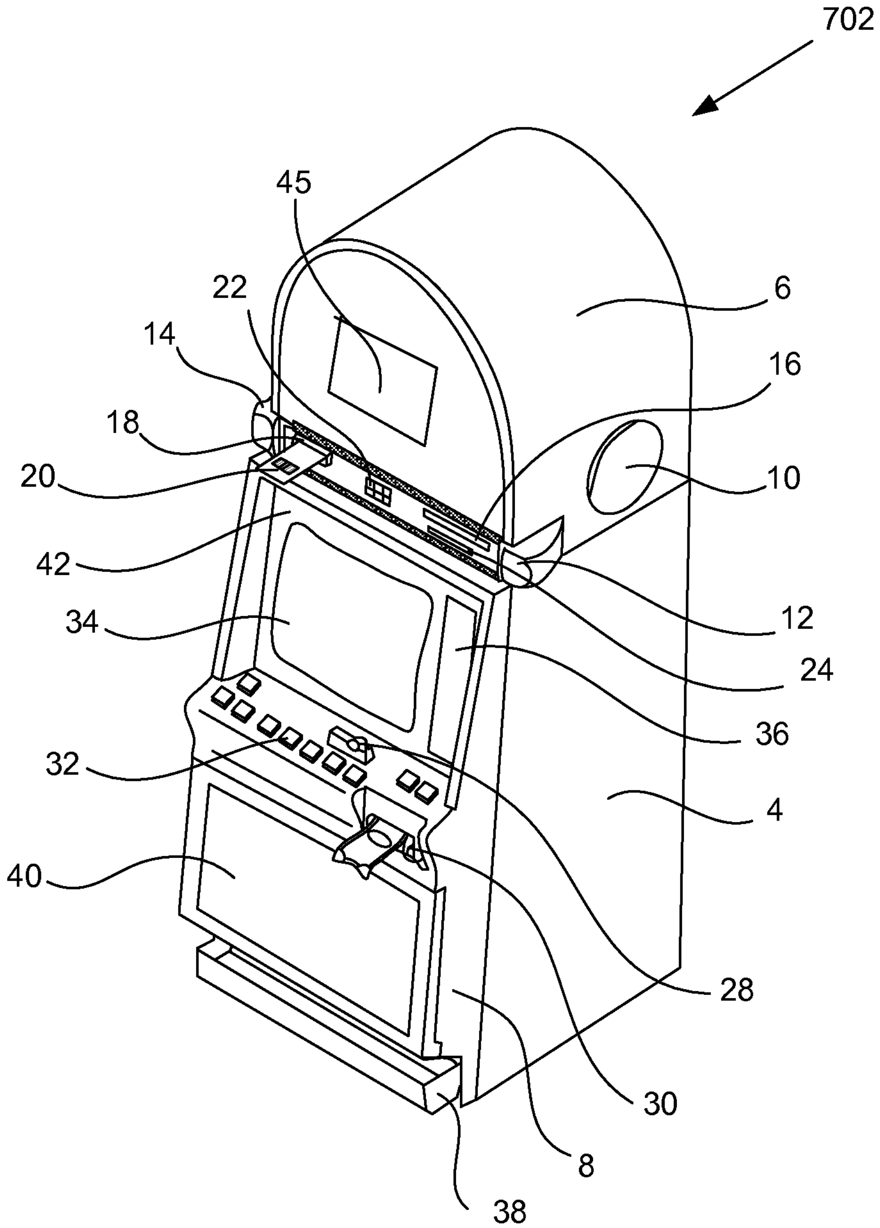
FIG. 8 illustrates an exemplary gaming machine that may be configured to implement some methods of the present invention.

Turning to FIG. 8, more details of gaming machine 702 are described. Machine 702 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 702. The devices are controlled by circuitry housed inside the main cabinet 4 of the machine 702.

The gaming machine 702 includes a top box 6, which sits on top of the main cabinet 4. The top box 6 houses a number of devices, which may be used to add features to a game being played on the gaming machine 702, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 702 is but one example from a wide range of gaming machine designs on which the present invention may be implemented. For example, not all suitable gaming machines have top boxes or player tracking features. Further, some gaming machines have two or more game displays—mechanical and/or video. Some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed. Moreover, some aspects of the invention may be implemented on devices which lack some of the features of the gaming machines described herein, e.g., workstation, desktop computer, a portable computing device such as a personal digital assistant or similar handheld device, a cellular telephone, etc. U.S. patent application Ser. No. 09/967,326, filed Sep. 28, 2001 and entitled "Wireless Game Player," is hereby incorporated by reference for all purposes.

Returning to the example of FIG. 8, when a user wishes to play the gaming machine 702, he or she inserts cash through the coin acceptor 28 or bill validator 30. In addition, the player may use a cashless instrument of some type to register credits on the gaming machine 702. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions. For example, a player may vary his or her wager on a particular game, select a prize for a particular game, or make game decisions regarding gaming criteria that affect the outcome of a particular game (e.g., which cards to hold). The player may make these choices using the player-input switches 32, the video display screen 34 or using some other hardware and/or software that enables a player to input information into the gaming machine (e.g. a GUI displayed on display 16).

During certain game functions and events, the gaming machine 702 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 702, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 702. In some embodiments, these tickets may be used by a game player to obtain game services.

IGT gaming machines are implemented with special features and/or additional circuitry that differentiate them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware components, software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player’s wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the “standard” EIA RS232 serial interfaces provided by general-purpose computers. These interfaces may include EIA RS485, EIA RS422, Fiber Optic Serial, Optically Coupled Serial Interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the trusted memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Gaming machines used for Class III games generally include software and/or hardware for generating random numbers. However, gaming machines used for Class II games may or may not have RNG capabilities. In some machines used for Class II games, RNG capability may be disabled.

Figure 9:
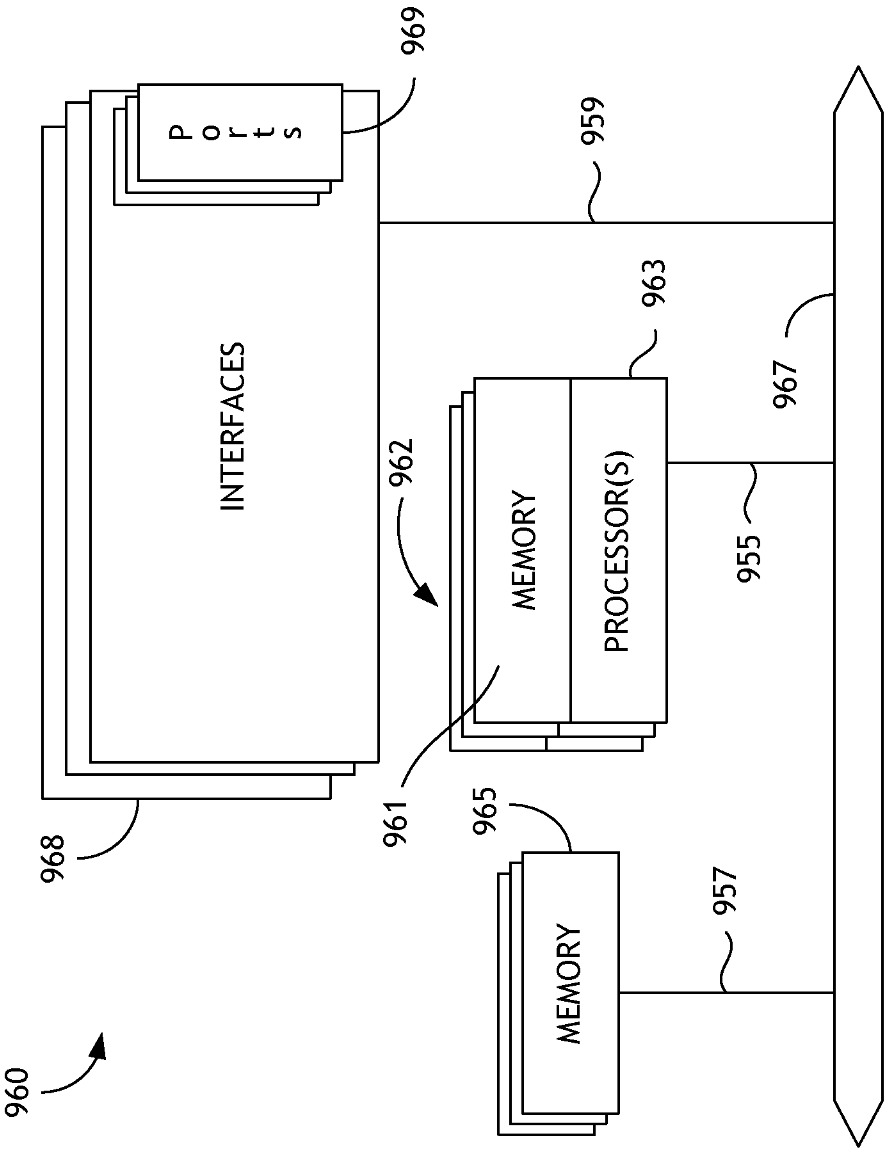
FIG. 9 is a block diagram of an exemplary network device that may be configured as a game server to implement some methods of the present invention.

FIG. 9 illustrates an example of a network device that may be configured as a game server for implementing some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "linecards"). Generally, interfaces 968 control the sending and receiving of data packets over the network and sometimes support other peripherals used with the network device 960. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 9) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims.

What is claimed is:

1. A method in a gaming machine comprising:

receiving, at the gaming machine, a request by a player to play a game on the gaming machine;

receiving, at the gaming machine, a data stream of the game from a server via a data network for network-based play of the game;

presenting, at the gaming machine, the data stream of the game to the player for networked-based play of the game;

downloading to the gaming machine, during the network-based play of the game, a locally executable form of the game over the data network, wherein the locally executable form of the game is locally executable on the gaming machine;

executing the locally executable form of the game on the gaming machine; and switching from the network-based game play of the game to the executed locally executable form of the game, including transferring state information of the networked-based play of the game to the executed locally executable form of the game being executed on the gaming machine such that game play by the player of the game is not interrupted during the switching.

2. The method of claim 1, wherein the data stream is generated when the game is executed on the server.

3. The method of claim 1, wherein the data stream is received after the game is executed or while the game is executed on the server.

4. The method of claim 1, further comprising:

maintaining current game settings for the game being executed at the server, the current game settings including the state information.

5. The method of claim 4, wherein the current game settings are downloaded over the data network from the server to the gaming machine.

6. The method of claim 4, wherein the current game settings are stored in a processor-readable storage medium situated in the gaming machine.

7. The method of claim 4, further comprising:

terminating execution of the game being executed at the server after the switching from the network-based game play to the locally executed form of the game.

8. The method of claim 4, wherein the current game settings are in XML format or in HTML format.

9. The method of claim 4, wherein current game settings for the locally executed form of the game being executed by the gaming machine are stored in game IO logic.

10. The method of claim 4, wherein the current game settings include a bet configuration.

11. A method in a gaming system including a server and a gaming machine, the method comprising:

executing, at the server, a game to output a data stream of the game for server-based game play of the game at the gaming machine;

sending the data stream of the game from the server to the gaming machine over a data network for server-based play of the game;

downloading, by the gaming machine, during server-based play of the game, a downloadable form of the game to the gaming machine via the data network;

executing the downloadable form of the game on the gaming machine; and switching from the server-based play of the game to an instance of the game executed locally on the gaming machine by transferring state information for the game executed at the server to the downloadable form of the game executed on the gaming machine such that game play by a player of the game is not interrupted during the switching from the server-based play of the game to the instance of the game executed locally on the gaming machine.

12. The method of claim 11, further comprising:

retrieving the game from a processor-readable storage medium.

13. The method of claim 11, further comprising:

terminating, after switching from the server-based play of the game to the instance of the game executed locally on the gaming machine, execution of the game at the server.

14. The method of claim 11, further comprising: authenticating the downloadable form of the game.

15. The method of claim 11, wherein the downloadable form of the game is executed by the gaming machine upon completion of downloading.

16. The method of claim 11, wherein the game is executed at the server in response to selection of the game at the gaming machine by the player.

17. The method of claim 11, wherein the data stream includes video data and audio data.

18. A method in a gaming system comprising:

executing a game application by a streaming server to output a data stream of an instance of a game;

sending the data stream from the streaming server to a device over a data network for server-based play of the instance of the game;

downloading, during the server-based play of the instance of the game, a downloadable form of the game application from a download server to the device over the data network;

executing the downloadable form of the game application by the device independent of the streaming server; and switching from the server-based play of the instance of the game to device-based play of the game application by transferring state information for the game application executed by the streaming server to the downloadable form of the game application executed by the device such that a player of the server-based play instance of the game continues game play of the instance of the game on the game application executed by the device without interruption during the switching from the server-based play of the game to the device-based play of the game.

19. The method of claim 18, further comprising:

retrieving the game application from a processor-readable storage medium.

20. The method of claim 18, further comprising:

terminating, after switching from the server-based play of the instance of the game to the device-based play of the game application, execution of the game application at the streaming server.

21. The method of claim 18, further comprising:

authenticating the downloadable form of the game application.

22. The method of claim 18, wherein the downloadable form of the game application is executed by the device upon completion of downloading.

23. The method of claim 18, wherein the game application is executed by the streaming server in response to selection of the game at the device.

24. The method of claim 18, wherein the data stream includes video data and audio data.

25. A device comprising:

a game logic module configured to:

i) receive a data stream of a game executed at a server over a data network for network-based play of the game, and ii) download, during the network-based play of the game, a downloadable form of the game over the data network, to the device; and a processor configured to:

i) present the data stream of the game to a player via an output of the device;

ii) execute the downloadable form of the game independent of the network-based play of the game, and iii) switch from the network-based play of the game to device-based play of the game by transferring state information for the game executed at the server to the downloadable form of the game executed by the processor such that game play by the player of the game is not interrupted during the switch.

26. The device of claim 25, further comprising:

a processor readable storage medium configured to maintain current game settings including the state information for the game being executed at the server.

27. A system comprising:

a device configured to communicate with a data network;

a streaming server configured to communicate with the device via the data network, the streaming server having access to a game and configured to:

i) execute the game to produce a stream of the game, and ii) send the stream of the game to the device over the data network for server-based play of the game; and a download server configured to communicate with the device via the data network, the download server having access to a downloadable form of the game, the download server configured to transmit, during the server-based play of the game, the downloadable form of the game to the device over the data network;

wherein the device is further configured to:

i) present the stream of the game to a player via an output of the device;

ii) execute the downloadable form of the game independent of the streaming server during presentation of the stream of the game to the player, and iii) switch from the server-based play of the game to device-based play of the game by transferring state information for the game executed by the streaming server to the downloadable form of the game executed by the device such that game play by the player of the game is not interrupted during the switch.

28. A computer program product, stored on a non-transitory processor-readable medium, comprising instructions for controlling one or more processors of a gaming machine to:

receive, at the gaming machine, a data stream of a game being executed at a server, the data stream received over a streaming channel of a data network for network-based play of the game;

download, during the network-based play of the game, a locally executable form of the game at the gaming machine over a download channel of the data network;

execute the locally executable form of the game by the gaming machine independent of the network-based play of the game; and switch from the network-based play of the game to the locally executed form of the game, including transferring state information for the game executed by the streaming server to the locally executable form of the game executed by the gaming machine such that game play by the player of the game is not interrupted during the switching.

* * * * *